United States Patent
Uhrich et al.

(10) Patent No.: US 8,079,351 B2
(45) Date of Patent: Dec. 20, 2011

(54) TEMPERATURE SENSOR DIAGNOSTICS

(75) Inventors: Michael James Uhrich, West Bloomfield, MI (US); Shane Elwart, Ypsilanti, MI (US); Michael Igor Kluzner, Oak Park, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 978 days.

(21) Appl. No.: 11/972,419

(22) Filed: Jan. 10, 2008

(65) Prior Publication Data

US 2009/0182488 A1   Jul. 16, 2009

(51) Int. Cl.
*F02B 75/08*   (2006.01)
*G06F 7/00*   (2006.01)

(52) U.S. Cl. ........ 123/688; 123/689; 123/690; 701/109; 701/114

(58) Field of Classification Search .................. 123/688, 123/689, 690, 693, 694, 697; 701/106, 107, 701/109, 114, 115; 73/114.69, 114.71, 114.72, 73/114.73, 114.75
See application file for complete search history.

(56) References Cited

U.S. PATENT DOCUMENTS

| | | | |
|---|---|---|---|
| 4,170,969 A * | 10/1979 | Asano | 123/680 |
| 5,083,427 A * | 1/1992 | Anderson | 60/274 |
| 5,505,183 A * | 4/1996 | Sinha et al. | 123/688 |
| 5,522,219 A * | 6/1996 | Orzel et al. | 60/274 |
| 5,740,675 A * | 4/1998 | Shimasaki et al. | 60/274 |
| 6,258,232 B1 | 7/2001 | Hasegawa et al. | |
| 6,294,075 B1 | 9/2001 | Poggio et al. | |
| 6,381,952 B1 * | 5/2002 | Asanuma et al. | 60/284 |
| 6,571,602 B2 | 6/2003 | Ohkuma | |
| 6,679,238 B2 | 1/2004 | Nebiyeloul-Kifle et al. | |
| 6,990,854 B2 * | 1/2006 | van Nieuwstadt et al. | 73/114.75 |
| 7,286,926 B2 * | 10/2007 | Gotoh et al. | 701/114 |
| 7,523,653 B2 * | 4/2009 | Smith et al. | 73/114.69 |
| 2003/0019865 A1 * | 1/2003 | Whitney et al. | 219/497 |
| 2005/0102076 A1 | 5/2005 | Kariya et al. | |
| 2006/0117737 A1 | 6/2006 | Ohsaki | |
| 2007/0052454 A1 * | 3/2007 | Gose et al. | 327/108 |

* cited by examiner

*Primary Examiner* — Thomas Moulis
(74) *Attorney, Agent, or Firm* — Julia Voutyras; Alleman Hall McCoy Russell & Tuttle LLP

(57) ABSTRACT

A system for an internal combustion engine of a vehicle is disclosed. In one example, characteristics of an oxygen sensor are a basis for determining degradation of a temperature sensor. In this way, the system can provide redundant exhaust gas temperature sensing.

20 Claims, 7 Drawing Sheets

TEMPERATURE SENSOR DIAGNOSTICS

TECHNICAL FIELD

The present application relates to the field of automotive emission control and diagnostic systems and methods.

SUMMARY/BACKGROUND

Various approaches have been proposed for measuring exhaust gas temperature for engine control, such as using temperature estimates and temperature sensors. However, to reduce excess sensors, an alternative approach to temperature sensing uses heater exhaust gas oxygen sensors. For example, a heater of an exhaust gas oxygen sensor may be disabled and used as an indication of temperature.

However, the inventors herein have recognized various issues with such an approach. First, because the heater is disabled, the sensor may unavailable for use in air-fuel ratio control, thus leading to degraded engine operation when used for temperature measurement. In addition, it may be advantageous to sense temperature in locations where it is unnecessary, or merely superfluous, to also sensor oxygen content.

To address the above competing interests and contradictory approaches, in one embodiment, a system is provided for an internal combustion engine of a vehicle, comprising an emission control device in an exhaust stream of the engine, an exhaust gas oxygen sensor coupled upstream of the emission control device, a temperature sensor coupled adjacent the emission control device, and a controller coupled to the exhaust gas oxygen sensor and the temperature sensor, the controller identifying degradation of the temperature sensor responsive to the exhaust gas oxygen sensor during lean operation, where the controller operates the exhaust gas oxygen sensor in a temperature sensing mode to identify the degradation of the temperature sensor. In this way, it is possible to take advantage of a temperature sensor in the exhaust, while also enabling diagnostics for the temperature sensor via the exhaust gas oxygen sensor. In particular, because the exhaust gas oxygen sensor is used to diagnose degradation of the temperature sensor during lean operation (where the oxygen signal information may not be used), accurate air-fuel ratio control about stoichiometry can be maintained. Further, even though the temperature sensor is located in a caustic environment experiencing high temperatures, it is still possible to provide diagnostics without additional exhaust temperature sensors (although such sensors may be used, if desired).

BRIEF DESCRIPTION

DETAILED DESCRIPTION

Various sensors may be located in the exhaust stream of an internal combustion engine to accurately control the efficiency of the combustion cycle and exhaust treatment devices. These sensors may include Exhaust Gas Oxygen (EGO) sensors and temperature sensors, for example. Due to the caustic conditions and the high temperature in the exhaust stream, temperature sensors located in the exhaust may degrade. This can lead to ineffective control of the combustion cycle and exhaust treatment devices, which can cause increased emissions. Various approaches are described herein for diagnosing degraded exhaust gas temperature sensors.

Figure 1:
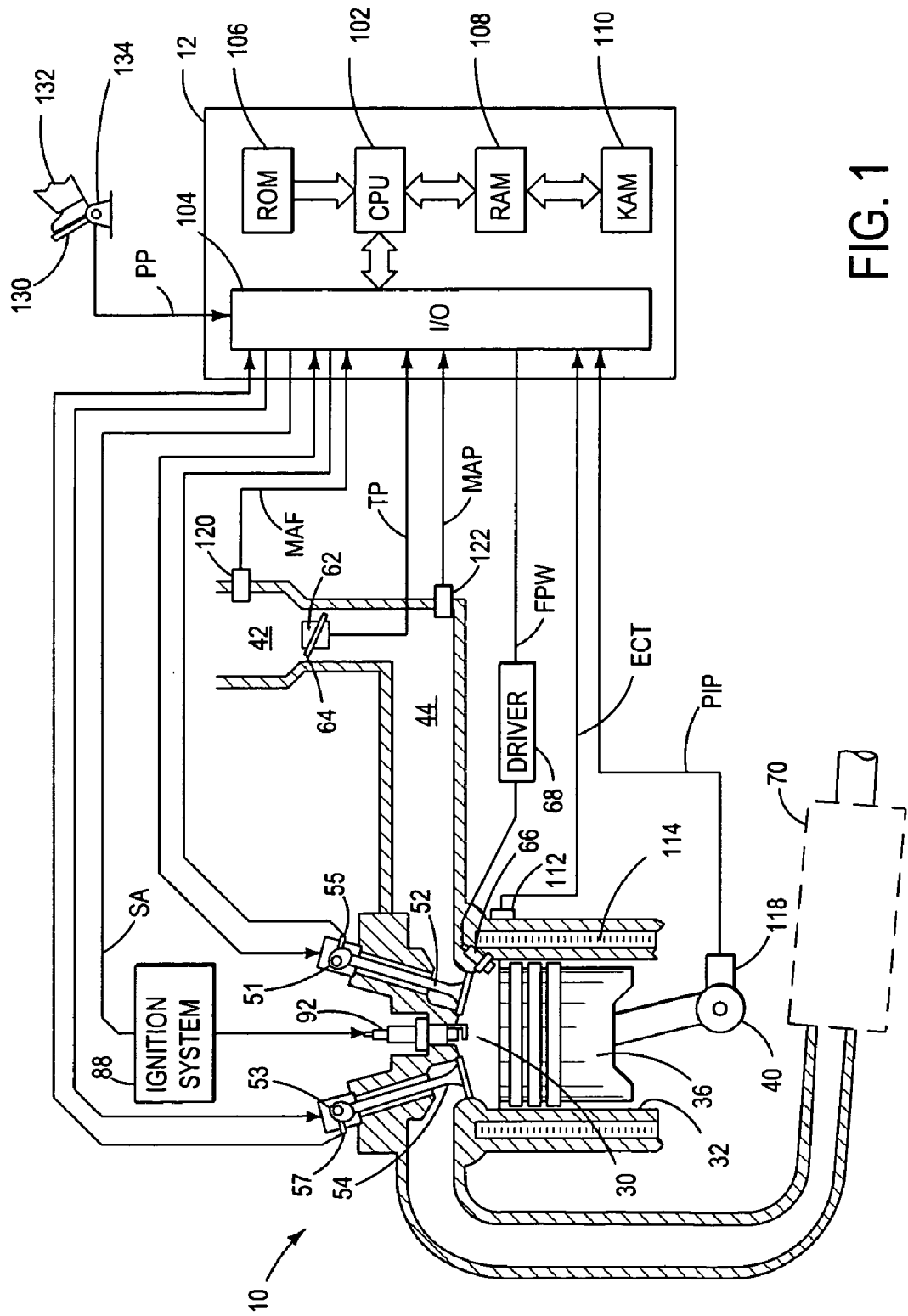
FIG. 1 shows a schematic depiction of an internal combustion engine.

FIG. 1 is a schematic diagram showing one cylinder of multi-cylinder engine 10, which may be included in a propulsion system for a passenger vehicle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; absolute manifold pressure signal, MAP, from sensor 122; ambient temperature from ambient temperature sensor (not shown);and ambient humidity from ambient humidity sensor (not shown). Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. In one example, sensor 118, which is also used as an engine speed sensor, may produce a predetermined number of equally spaced pulses every revolution of the crankshaft.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

As described above, FIG. 1 shows only one cylinder of a multi-cylinder engine, and that each cylinder may similarly include its own set of intake/exhaust valves, fuel injector, spark plug, etc. Further, a plurality of cylinders may be coupled to intake manifold 44 and exhaust manifold 48, or a bank of cylinders may be coupled to respective intake and exhaust manifolds.

Figure 2:
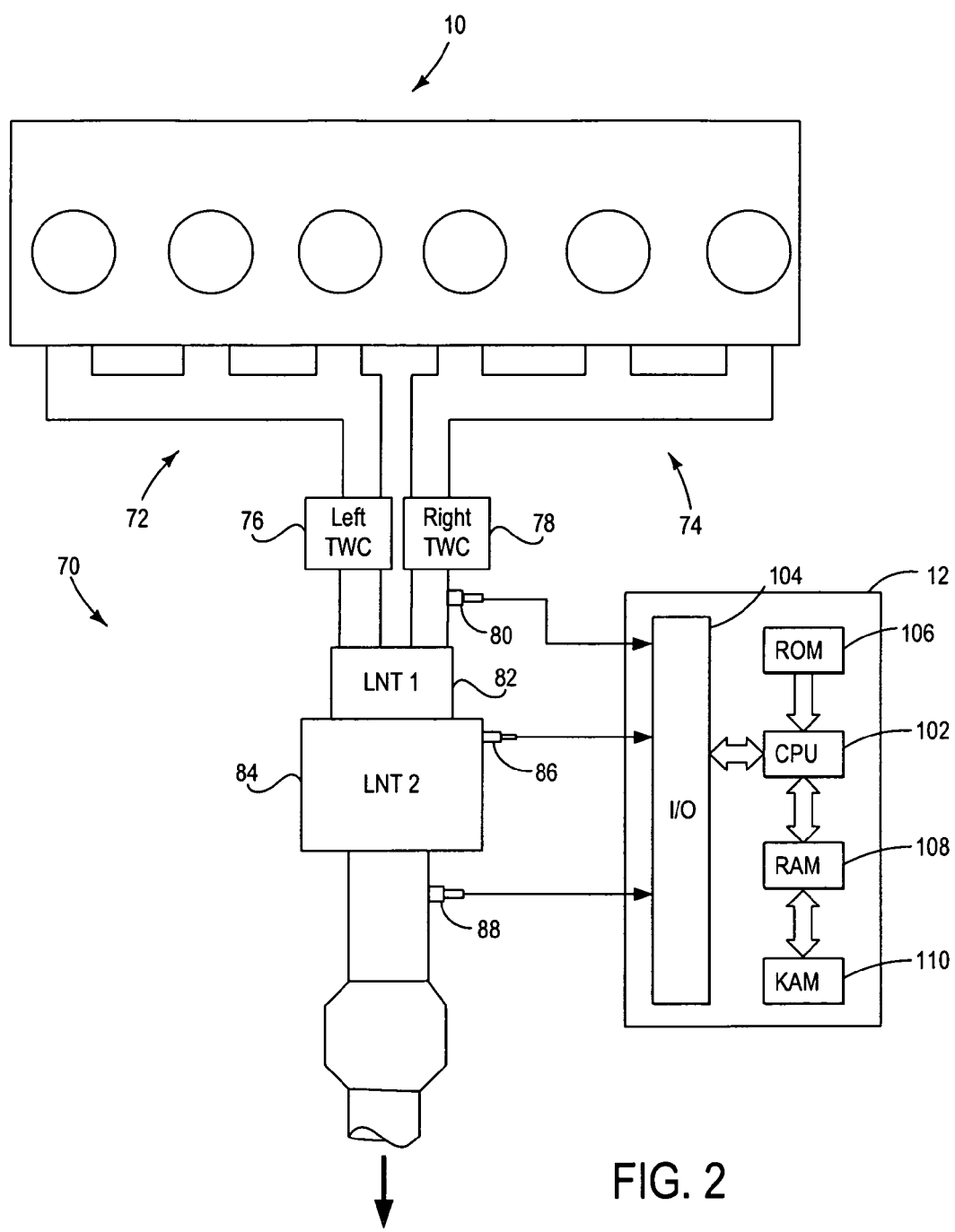
FIG. 2 shows a schematic depiction of an exhaust system for an internal combustion engine.

FIG. 2 shows a schematic depiction of an exhaust system 70 for an internal combustion engine 10. In this embodiment the engine is arranged in an inline 6-cylinder configuration. However, other configurations may be used such as a V-6, I-4, V-8, or a flat 8, for example. A left exhaust stream 72 and a right exhaust stream 74 are fluidly coupled to engine 10. A left three way catalyst (TWC) 76 and a right TWC 78 are fluidly coupled to the left exhaust stream and right exhaust stream, respectively. In alternate embodiments both the left and right TWC's may be alternative emission control devices, such as lean NOx traps or other suitable emission control devices such as a three way catalytic convertor. In other embodiments a single TWC may be coupled to the left and right exhaust stream, replacing the left TWC and the right TWC. In other embodiments the TWC's may be removed.

A heated exhaust gas oxygen (HEGO) sensor 80 is located directly downstream of the right TWC. In alternate embodiments HEGO sensor 80 may be located downstream of the left TWC. In other embodiments HEGO sensor 80 may be an alternative exhaust gas oxygen sensor, such as a universal exhaust gas oxygen (UEGO) sensor. Sensor 80 provides an indication of exhaust gas oxygen content. In one mode, the air fuel ratio may be adjusted in response to the exhaust gas oxygen sensor to maintain the exhaust air fuel ratio about stoichiometry (e.g. the controller adjusts fuel injection based on the exhaust gas oxygen sensor 80 and possibly other sensors to maintain a desired air fuel ratio). In other modes, for example when the engine is running lean, the air fuel ratio may be adjusted independently of the exhaust gas oxygen sensor 80.

As described further herein, during selected conditions, the HEGO senor 80 may be configured to indicate temperature of the exhaust gas, as well as the oxygen content of the gas in the exhaust stream. Specifically, when the heater in the HEGO sensor 80 is disabled, a small current may be passed through the heater so that the resistance of the heater may be correlated to exhaust temperature. Under some conditions, such operation may result in a degraded indication of the exhaust gas oxygen content. For example, if the exhaust temperature is below a desired HEGO operating temperature, such a temperature measurement can result in inaccurate oxygen readings until the HEGO sensor returns to its operating temperature, either via increased exhaust gas temperature, heater operation, or both. Thus, in some embodiment, feedback correction of engine air-fuel ratio (e.g. fuel injection amount feedback correction) may be disabled when the HEGO sensor is operated to indicate exhaust gas temperature. Furthermore, when it is indicated that the HEGO sensor 80 is below a predetermine threshold temperature the air-fuel ratio feedback control of the engine based on sensor 80 may be disabled (e.g., air fuel ratio will be adjusted independent from the exhaust gas oxygen sensor, and possibly based on other exhaust gas oxygen sensors, or in an open loop based on MAF). However, if it is indicated that the HEGO sensor is above a specified threshold value, then air fuel feedback control based on sensor 80 may be carried out. The threshold temperature may be determined by the type of sensing element used as well as the material properties of the protective cover and other components in the sensor. This may to occur during cold starts. In this way air fuel feedback control of the engine may be implemented intermittently.

A first lean NOx trap (LNT1) 82 is located downstream of the HEGO sensor. A second LNT2 84 may be fluidly coupled to LNT1 82. In some embodiments LNT2 may be removed. In alternate embodiment both the LNT's may be three way catalytic convertors. The lean NOx traps may operate to reduce exhaust emissions, such as during lean operation. Further, an exothermic reaction may occur in LNT1 and LNT2 during selected operation, such as when transitioning from lean to rich operation, or thereafter. Further, other conditions may generate exothermic reactions across the LNTs, such as oscillator air-fuel ratio swings between lean and rich conditions.

Figure 7:
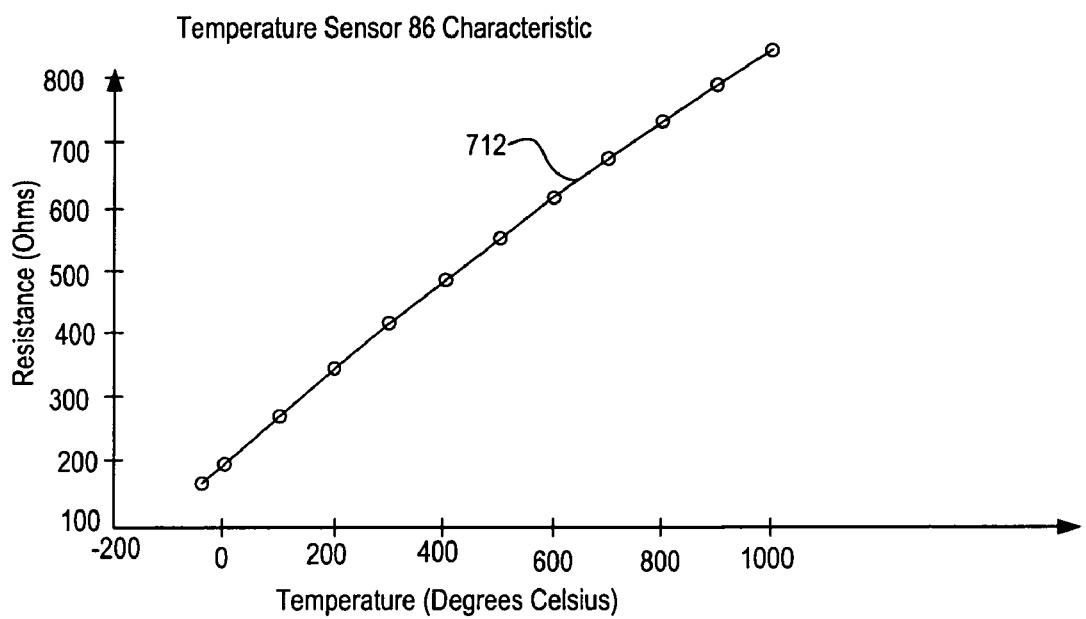
FIG. 7 shows a graphical depiction of the temperature sensor 86 characteristics.

Temperature sensor 86 may be adjacent to LNT2 84. For example temperature sensor may be coupled directly to LNT2 or may be coupled directly upstream or directly downstream of the device, and in close proximity to LNT2. In alternate embodiments temperature sensor 86 may be adjacent to the LNT1. The sensing element in the temperature sensor may be constructed out of platinum and the protective cover may be sealed with a high temperature glass sealant. The range of temperatures over which temperature sensor 86 can operate is shown in FIG. 7, discussed in more detail herein. In alternate embodiment the temperature senor may be an alternative temperature sensor capable of operating accurately over a sufficiently wide range of temperatures.

EGO sensor 88 may be located downstream of the LNT2. EGO sensor 88 may be various exhaust gas sensors, such as a HEGO senor, a UEGO sensor, or a NOx sensor. In alternate embodiment the EGO sensor may be removed. In one embodiment, EGO sensor 88 may be used to control air fuel feedback in the engine when the HEGO sensor 80 operates to indicate exhaust gas temperature.

Controller 12 may also receive various signals from sensors in the exhaust stream such as; LNT2 temperature from temperature sensor 86; exhaust gas temperature from the HEGO sensor; and one or more signals from HEGO sensor 80.

Figure 3:
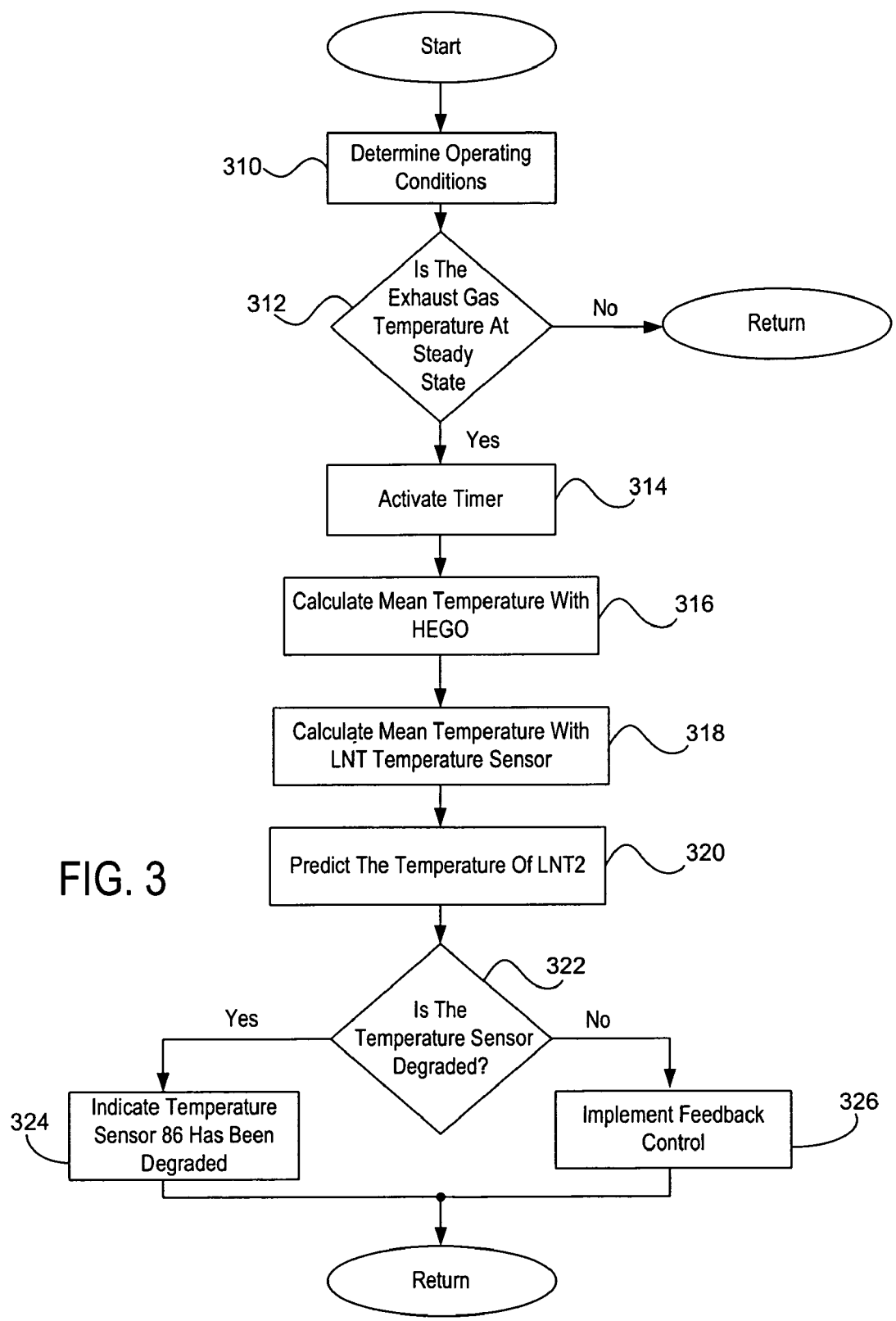
FIG. 3 depicts a control strategy implemented to detect degradation of a temperature sensor located in the exhaust stream when the exhaust system is experiencing steady state conditions.

FIG. 3 depicts a control strategy that may be implemented to detect degradation of the temperature sensor located in the exhaust stream. The control strategy may be performed when the exhaust stream is experiencing steady state conditions, such as when exhaust temperature is changing within a selected range and below a selected rate.

At 310 the routine determines the operating conditions of the system. These operating conditions may include exhaust temperature, engine temperature, ambient temperature etc. The routine then advances to 312, where it is determined if the HEGO sensor 80 is experiencing steady state conditions. If the HEGO sensor is not experiencing steady state conditions, then the routine returns to the start. However, if the HEGO sensor 80 is experiencing steady state conditions, then the routine advances to 314 where a timer is activated. In this embodiment the timer may be a program stored in the controller. In alternate embodiments the timer may be separate from the controller.

The routine then proceeds to 316 where the mean temperature measured by the HEGO sensor, over a predetermine period of time, is calculated. The routine then proceeds to 318 where the mean temperature measured by temperature sensor 86, over a predetermined period of time, such as during operation of the time, is calculated.

The routine then proceeds to 320 where the temperature of the LNT2 is estimated. The predicted temperature may be calculated based on the temperature measured by the HEGO sensor 80 and other factors that may include flowrate of the exhaust stream and chemical composition of the first and second Lean NOx Traps, as well as exothermic reactions of the devices.

The routine then proceeds to 322, where it is determined if temperature sensor 86 has been degraded. The temperature of the exhaust stream measured by the HEGO 80 may be compared with the estimated temperature. If the difference between the measured temperature and estimated temperature is greater than a predetermined value, then the controller may determine that temperature sensor 86 has been degraded.

When it is determined that temperature sensor 86 has been degraded the routine proceeds to 324. At 324 an indication is made that temperature sensor 86 has been degraded. Various actions may be taken, such as disabling the use of the temperature sensor 86 and/or indicating to the operator of the vehicle that the sensor has been degraded. For example an indicator light may be turned on to alert the driven that the sensor has been degraded, or that engine/emission service is requested. Further, a diagnostic code may be set that can be retrieved by a service technician. The routine will then return to the start.

However, if the difference between the temperature measured by the HEGO sensor and the estimated temperature is inside a predetermined range, then the routine proceeds to 326 where air-fuel feedback control is implemented. After 326 the routine will return to the start.

Figure 4:
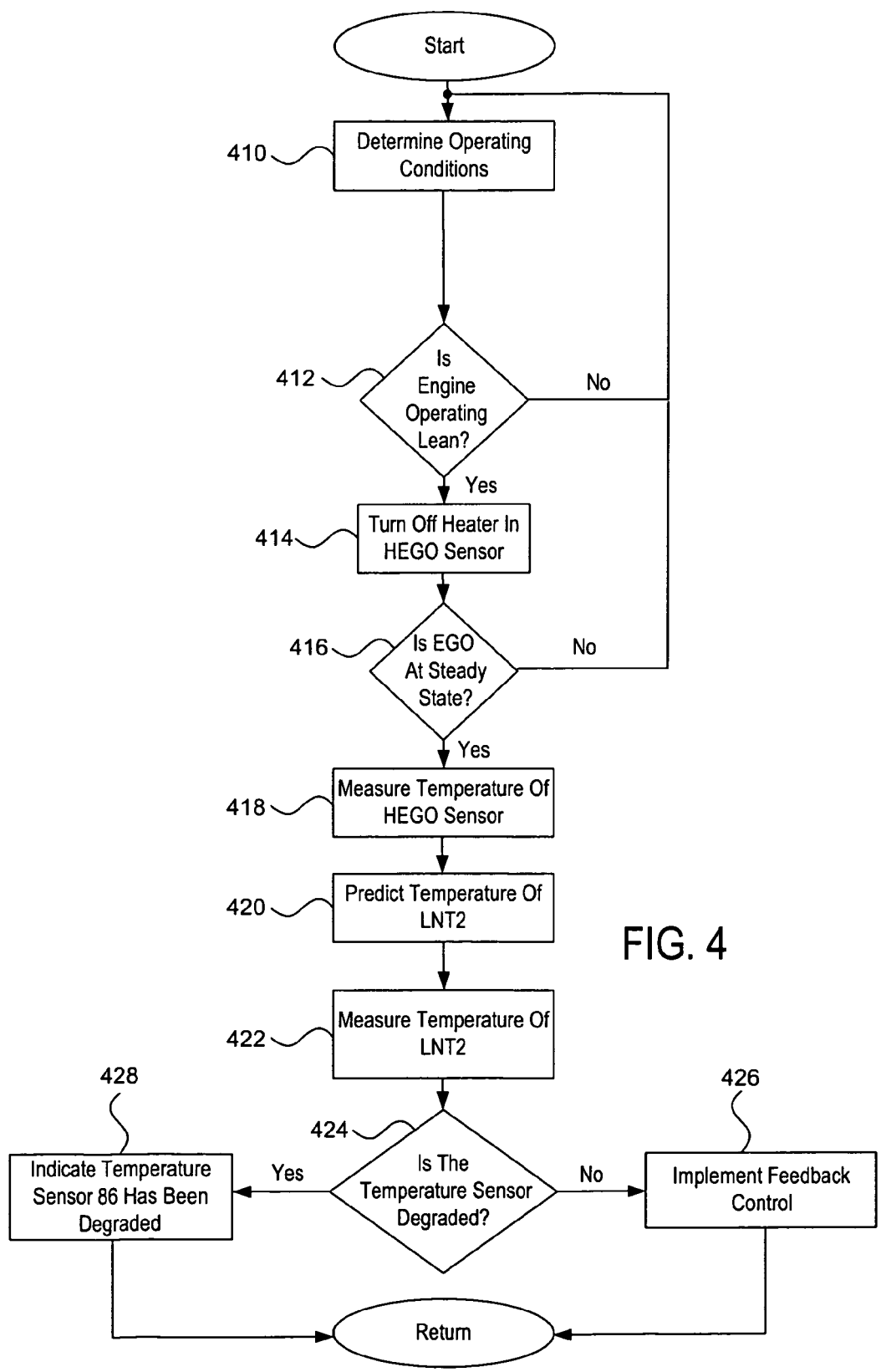
FIG. 4 depicts an alternate control strategy implemented to detect degradation of a temperature sensor located in the exhaust stream when the engine is running lean.

FIG. 4 depicts a control strategy that may be implemented to detect degradation of the temperature sensor (86) located in the exhaust stream. This control strategy may be implemented during lean operation (e.g. lean combustion conditions) of the engine when air-fuel feedback control using HEGO 80 of the engine may not be interrupted or disabled. This allows diagnostics of temperature sensor 86 to be performed without interfering with the air-fuel feedback control in the engine, or at least with reduced interference. This control strategy may be carried out periodically during operation of the engine.

At 410 the routine determines various operating conditions. In this embodiment the operating condition may be assessed by controller 12. These operating conditions may include air fuel ratio, throttle position, exhaust gas composition, fuel pulse width, HEGO temperature, LNT2 temperature, etc.

The routine then advances to 412 where the routine determines if the engine is operating in a lean combustion region. As noted above, the air-fuel ratio may be determined by controller 12 which receives various signals from sensor located in the engine and the exhaust stream. If the engine is not running lean, then the routine will return to the start. However, if the engine is running lean, then the routine will proceed to 414 where the heater in the HEGO sensor 80 may be turned-off, or disabled, for a predetermined duration (such as a period of time), allowing the HEGO sensor 80 to reach steady state temperature.

The routine then proceeds to 416 where it is determined if the HEGO sensor is at steady state. This determination is made by the controller which measures the time rate of change of the resistance in the substrate, thereby measuring the temperature in the exhaust stream. Alternatively, the rate of change over another parameter, such as sampling events, may be used. If the rate of change of the resistance in the substrate is below a predetermined threshold, then the HEGO sensor 80 is determined to be substantially at steady state.

If the HEGO sensor 80 is not at steady state, then the routine returns to 414 where the heater in the HEGO sensor 80 continues to be maintained disabled for a predetermined period of time. If the HEGO sensor 80 is at steady state, then the routine will advance to 418 where the temperature of the exhaust stream is measured by the HEGO sensor. The temperature of the HEGO sensor 80 may be calculated by running a small current through the substrate of the HEGO sensor to determine resistance. The temperature of the HEGO sensor can be calculated from the measured resistance. However, other approaches may be used to determine temperature from HEGO sensor 80.

The routine then advances to 422 where the temperature in the exhaust stream is measured with temperature sensor 86. The routine then proceeds to 426 where it is determined if degradation of temperature sensor 86 has occurred. In this embodiment the temperature of LNT2 is predicted based the temperature measured by the HEGO sensor 80. The predicted temperature is compared to the temperature measured by temperature sensor 86. If the difference between the predicted temperature and the measured temperature of the LNT2 is within a predetermined range, then the routine will advance to 428 where air-fuel feedback control is implemented. However, if the difference between the predicted temperature and the measured temperatures is outside a predetermined range, then the routine will advance to 430 where the HEGO sensor is disabled and the controller indicates that the temperature sensor 24 has been degraded. Various actions may be taken to alert the operator of the vehicle that the temperature sensor has been degraded and/or air fuel feedback control has been disabled. For example an indicator light may be turned on to alert the driven that the HEGO sensor has been degraded.

Figure 5:
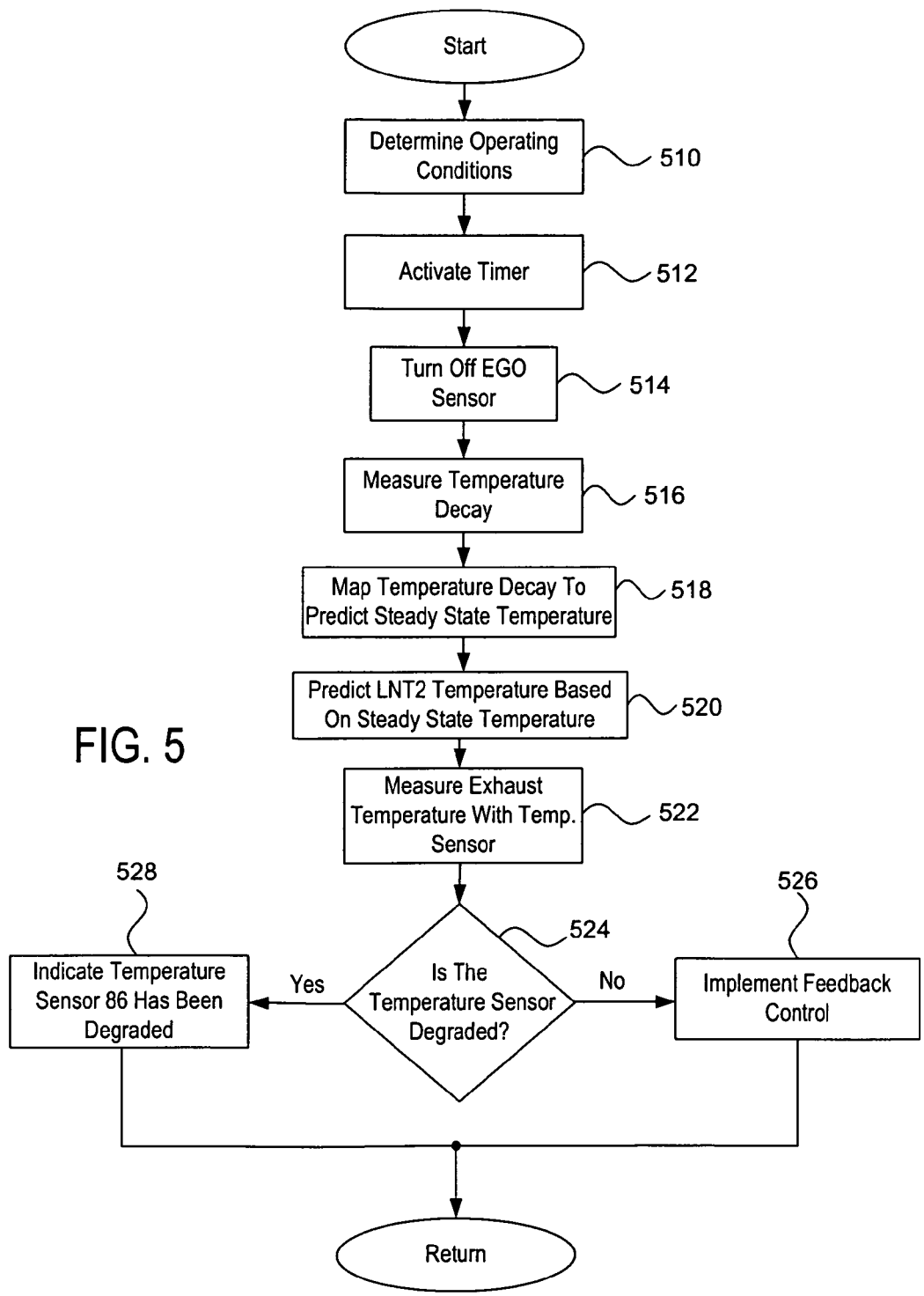
FIG. 5 depicts an alternate control strategy implemented to detect degradation of a temperature sensor located in the exhaust stream.

FIG. 5 depicts a control strategy that may be implemented to detect degradation of the temperature sensor 86. This strategy can be implemented before the HEGO sensor has reached steady state, allowing the HEGO sensor to be deactivated for a short period of time, minimizing the amount of time the feedback air fuel control in the engine is disabled. This allows the control strategy to be implemented when the engine is running lean, stoichiometric, or rich. The control strategy may be implemented periodically during operation of the engine. For example, it may be implemented during operation emission control device to be monitored based on the temperature sensor. During a first mode, the air-fuel ratio may be adjusted in response to the exhaust gas oxygen sensor 80 to maintain exhaust air-fuel ratio about stoichiometry, where the engine operation may also be adjusted responsive to the monitored temperature. For example, the engine spark timing and/or other operating parameters may be adjusted to increase and/or decrease exhaust temperature measure by sensor 86. Then in a second, intermittent, diagnostic mode, the heater in the exhaust gas oxygen sensor 80 may be disabled and the exhaust temperature measured from at least the initial decay of a temperature indication from the exhaust gas oxygen sensor 80. In this way, it is possible to reduce the duration where air-fuel feedback information from the sensor 80 is unavailable (or potentially degraded), since the initial decay can be utilized to indicate the steady state temperature, while still enabling diagnostic information regarding the temperature sensor 86.

At 510 the routine determines various operating conditions. These operating conditions may include exhaust temperature, air fuel ratio, throttle position, exhaust gas composition, fuel pulse width, ect.

The routine will then proceed to 512 where a timer is activated. In this embodiment the timer may be a program stored in the controller. In alternate embodiments the timer may be separate from the controller. The routine advances to 514 where the heater in the HEGO sensor is turned off for a predetermined period of time.

The routine proceeds to 516 where the timed rate of change of the HEGO temperature is measured for a predetermined amount of time to determine an initial decay of the HEGO temperature indication to steady state. In this embodiment a plurality of measurements of the HEGO temperature are taken to determine a temperature profile of the HEGO sensor during the initial decay toward the steady state temperature indication. The duration that the HEGO sensor 80 is used to indicate temperature may thus be reduced to decrease the effects of such operation on air-fuel feedback control of the engine.

For example, the initial decay may include points in the decay before the HEGO sensor 80 has reached steady state. In one example steady state may include a HEGO temperature within 10% of the final value. For example, the initial decay may be measured directly after the heater has been deactivated. Still other examples may include taking a plurality of reading for some period of time after the heater has been deactivated and before the temperature of the senor has reached steady state.

The routine proceeds to 518 where the temperature decay to steady state temperature of the HEGO sensor is mapped using the decay equation, $$T(t)=T_0 e^{-t/\tau} \tag{1}$$

Various other decay models may also be used. The routine then advances to 520 where the temperature of the LNT2 is predicted using the calculated steady state temperature of the HEGO. The routine then advances to 520 where temperature of the exhaust stream is measured with temperature sensor 86. The routine then proceeds to 522 where it is determined if degradation of temperature sensor 86 has occurred. Degradation is determined by comparing the predicted temperature of LNT2 with the measured temperature of LNT2. If the difference between predicted temperature and the measured temperature of LNT2 is within a predetermined range, then the routine will advance to 524 where air-fuel feedback control is implemented based on oxygen content indicated by sensor 80.

However, if the difference between the predicted temperature and the measured temperature of LNT2 is outside a predetermined range, then the routine advances to 526 where the HEGO sensor is disabled and the controller indicates that temperature sensor 86 has been degraded. Various actions may be taken to alert the operator of the vehicle that the temperature sensor has been degraded and/or air fuel feedback control has been disabled. For example an indicator light may be turned on to alert the driven that the HEGO sensor has been degraded.

Figure 6:
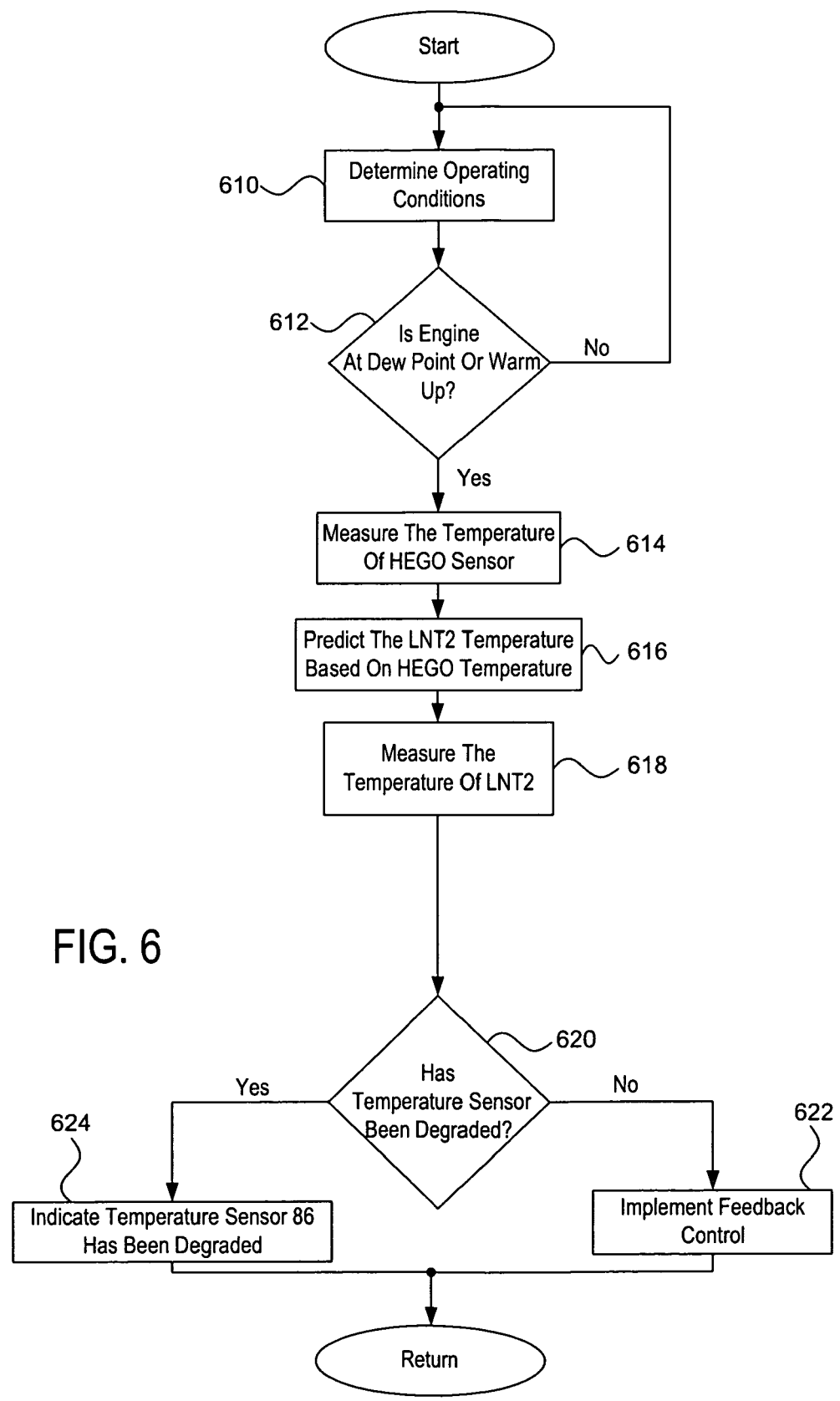
FIG. 6 depicts an alternate control strategy implemented to detect degradation of a temperature sensor located in the exhaust stream when the engine is warming up or the exhaust temperature is below the dew point temperature.

FIG. 6 depicts a control strategy that may be implemented to detect degradation of the temperature sensor 86 during engine warm up or when the exhaust stream temperature is at or below the dew point. During warm up feedback air fuel control of the exhaust stream is not implemented. This allows diagnostics of temperature sensor 86 to be performed without interfering with the air-fuel feedback control in the engine using HEGO sensor 80.

At 610 the routine determines various operating conditions. In this embodiment the operating condition may be assessed by controller 12. These operating conditions may include exhaust temperature, exhaust pressure, ambient temperature, ambient humidity, engine temperature, key position, engine speed, crank angle ect.

The routine then proceeds to 612 where it is determined if the exhaust temperature is at or approaching the dew point. Alternatively, the routine may determine if the engine is in warm up. The control may indicate when the temperature of the vehicle is at or approaching the dew point. If the engine temperature is not approaching dew point, then the routine returns to the start. However, if the engine temperature is approaching dew point, then the routine will proceed to 614 where the temperature of the HEGO sensor is measure by applying a small current to the substrate.

The routine then proceeds to 616 where the temperature of the LNT2 is predicted based on the temperature of the HEGO sensor. The routine then advances to 618 where the temperature of the LNT2 is measured with temperature sensor 86.

The routine then proceeds to 620 where it is determined if degradation of temperature sensor 86 has occurred. Degradation is determined by comparing the predicted temperature of LNT2 with the measured temperature of LNT2. If the difference between predicted temperature and the measured temperature of LNT2 is within a predetermined range, then the routine will advance to 622 where air fuel feedback control is implemented. However, if the difference between the predicted temperature and the measured temperature of LNT2 is outside a predetermined range, then the routine advances to 624 where the HEGO sensor is disabled and the controller indicates that temperature sensor 86 has been degraded. Various actions may be taken, such as disabling the use of the HEGO sensor and/or indicating to the operator of the vehicle that the temperature sensor has been degraded and/or air fuel feedback control has been disabled. For example an indicator light may be turned on to alert the driven that the temperature sensor has been degraded.

The control strategies depicted in FIG. 3, FIG. 4, FIG. 5, and FIG. 6 may be implemented concurrently. In other examples only one of the control strategies depicted in FIG. 3, FIG. 4, FIG. 5, and FIG. 6 may be implemented to detect degradation of the temperature sensor. In one example the control strategies may be implemented after the vehicle has reached a predetermined number of miles driven. In this embodiment the various control strategies depicted in FIG. 3-FIG. 6 may be implemented via a diagnostic code stored in controller 12. In alternate embodiments the various control strategies depicted in FIG. 3-FIG. 6 may be implemented by a control system including a plurality of controllers.

FIG. 7 shows a graph depicting resistance vs. temperature of sensor 86. The relationship between resistance and temperature of sensor 86, represented by line 712, is approximately linear. The proportional variation between temperature and resistance allows the sensor to accurately function over a wide range of temperatures. The temperature sensor may be capable of accurately operating in regions of the exhaust stream above 200 degrees Celsius.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps, functions, or acts may be repeatedly performed depending on the particular strategy being used. Further, the described steps, functions, and/or acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an internal combustion engine of a vehicle, comprising:
   an emission control device in an exhaust stream of the engine;
   an exhaust gas oxygen sensor coupled upstream of the emission control device;
   a temperature sensor coupled adjacent the emission control device; and
   a controller coupled to the exhaust gas oxygen sensor and the temperature sensor, the controller identifying degradation of the temperature sensor responsive to the exhaust gas oxygen sensor during lean operation, where the controller operates the exhaust gas oxygen sensor in a temperature sensing mode to identify the degradation of the temperature sensor, and where the controller measures an initial temperature decay of the exhaust gas oxygen sensor to predict an exhaust temperature and identify the degradation of the temperature sensor.

2. The system of claim 1 where the emission control device is a lean NOx trap that carries out an exothermic reaction during said identification of degradation.

3. The system of claim 1 where the controller adjusts fuel injection independent from the exhaust gas oxygen sensor when the exhaust gas oxygen sensor is in the temperature sensing mode.

4. The system of claim 3 where the exhaust gas oxygen sensor is a heated exhaust gas oxygen sensor, and further comprising where the controller continues to adjust fuel injection based on the exhaust gas oxygen sensor to maintain a desired exhaust gas air-fuel ratio when the exhaust gas oxygen sensor indicates the exhaust temperature is above a desired exhaust gas oxygen sensor temperature.

5. The system of claim 2 where the controller determines a temperature effect of the exothermic reaction in the lean NOx trap when identifying degradation of the temperature sensor.

6. The system of claim 1 wherein the controller adjusts an engine air-fuel ratio based on a different exhaust gas oxygen sensor when the controller operates the exhaust gas oxygen sensor in the temperature sensing mode.

7. The system of claim 1 wherein feedback air-fuel control responsive to the exhaust gas oxygen sensor is disabled during the lean operation, and where the controller operates the exhaust gas oxygen sensor in the temperature sensing mode for a first duration that is shorter than a second duration where the exhaust gas oxygen sensor reaches a steady state exhaust temperature, and where the controller identifies the degradation of the temperature sensor based on a temperature indication profile from the exhaust gas oxygen sensor during the first duration.

8. A system for an internal combustion engine of a vehicle, comprising:
   a catalytic convertor in an exhaust stream of the engine;
   an exhaust gas oxygen sensor coupled downstream of the catalytic convertor;
   a lean NOx trap coupled downstream of the exhaust gas oxygen sensor;
   a temperature sensor coupled adjacent the lean NOx trap; and
   a controller coupled to the exhaust gas oxygen sensor and the temperature sensor, the controller identifying degradation of the temperature sensor responsive to the exhaust gas oxygen sensor, where the controller operates the exhaust gas oxygen sensor in a temperature sensing mode to identify the degradation of the temperature sensor, and where the controller identifies the degradation of the temperature sensor in an amount of time less than a time for a temperature of the exhaust gas oxygen sensor to reach a steady state after deactivating a heater of the exhaust gas oxygen sensor.

9. The system of claim 8 wherein the catalytic convertor is a three-way catalytic convertor.

10. The system of claim 9 wherein the controller further maps a temperature decay of the exhaust gas oxygen sensor.

11. The system of claim 10 wherein the temperature sensor can operate in regions of the exhaust stream above 200 degrees Celsius.

12. The system of claim 11 further comprising wherein the controller measures a time rate of change of the exhaust gas oxygen sensor to identify the degradation of the temperature sensor.

13. A method for an internal combustion engine of a vehicle, the vehicle having an exhaust including an emission control device and a temperature sensor for measuring temperature of the emission control device, the exhaust further having a heated exhaust gas oxygen sensor, the method comprising:

monitoring temperature of the emission control device based on the temperature sensor;

during a first mode, adjusting air-fuel ratio of the engine responsive to the exhaust gas oxygen sensor to maintain exhaust air-fuel ratio about stoichiometry, where engine operation is adjusted responsive to the monitored temperature;

during a second, intermittent, diagnostic mode, disabling a heater of the exhaust gas oxygen sensor, predicting exhaust temperature responsive to a mapped initial decay of a temperature indication from the exhaust gas oxygen sensor; and indicating degradation of the temperature sensor based on the predicted exhaust temperature, and based on the monitored temperature.

14. The method of claim 13 where during the second mode, the air-fuel ratio of the engine is adjusted independent from the exhaust gas oxygen sensor.

15. The method of claim 13 further comprising indicating the degradation based on an exothermic temperature increase of the emission control device.

16. The method of claim 15 further comprising indicating the degradation via a diagnostic code.

17. The method of claim 15 further comprising indicating the degradation via an indicator light to an operator of the vehicle.

18. The method of claim 13 further comprising performing the second mode at least during one or more lean combustion conditions.

19. The method of claim 13 further comprising performing the second mode periodically.

20. The method of claim 19 further comprising performing the second mode after a predetermined number of miles driven.

* * * * *